US011695315B2

(12) United States Patent
Culpepper et al.

(10) Patent No.: US 11,695,315 B2
(45) Date of Patent: Jul. 4, 2023

(54) MAGNETIC TRANSMISSION

(71) Applicant: Massachusetts Institute of Technology, Cambridge, MA (US)

(72) Inventors: Martin Culpepper, Georgetown, MA (US); Marcel Thomas, Riverdale, GA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/106,855

(22) Filed: Nov. 30, 2020

(65) Prior Publication Data

US 2021/0242764 A1    Aug. 5, 2021

Related U.S. Application Data

(60) Provisional application No. 62/968,485, filed on Jan. 31, 2020.

(51) Int. Cl.
*H02K 41/02* (2006.01)
*H02K 7/06* (2006.01)
*H02K 21/14* (2006.01)

(52) U.S. Cl.
CPC .................................. *H02K 41/02* (2013.01)

(58) Field of Classification Search
CPC ........... H02K 49/10; H02K 21/14; H02K 7/06
USPC ............................................ 310/12.01, 12.04
See application file for complete search history.

(56) References Cited

U.S. PATENT DOCUMENTS 3,941,402 A    3/1976  Yankowski et al.
7,389,709 B2   6/2008  Zhou 7,624,631 B2    12/2009  Furuta et al.
2004/0041474 A1  3/2004  Lunz et al.
2014/0167539 A1  6/2014  Neuhaus et al.
(Continued)

FOREIGN PATENT DOCUMENTS

CN    110454317 A  * 11/2019
JP       3840306 B2 * 11/2006
JP    2016025700 A  *  2/2016

OTHER PUBLICATIONS

International Search Report and Written Opinion, dated Feb. 23, 2021, in connection with Application No. PCT/US2020/062564.
(Continued)

*Primary Examiner* — Jose A Gonzalez Quinones
(74) *Attorney, Agent, or Firm* — Wolf, Greenfield & Sacks, P.C.

(57) ABSTRACT

Magnetic transmissions and related methods are described. In one embodiment, an apparatus includes a magnetic screw comprising an elongate body, a nut selectively magnetically coupled to the magnetic screw, and a potential energy storage system and/or a resistive force component. The nut is configured to be displaced relative to the elongate body in a first direction in response to manipulation of a magnetic field between the magnetic screw and the nut when the nut is magnetically coupled to the magnetic screw. In embodiments including a potential energy storage system, the potential energy storage system may store potential energy when the nut is displaced in the first direction. In embodiments including a resistive force component, the resistive force component may resist motion of the nut in the first direction by applying a resistive force to the nut at least partially in an opposing second direction.

20 Claims, 5 Drawing Sheets

(56) References Cited

U.S. PATENT DOCUMENTS

2015/0231942 A1* 8/2015 Trangbaek ............ F16F 15/022
267/195
2016/0265618 A1* 9/2016 Berg ....................... F16H 25/24
2016/0344312 A1 11/2016 Trangbaek et al.

OTHER PUBLICATIONS

PCT/US2020/062564, Feb. 23, 2021, International Search Report and Written Opinion.

* cited by examiner

MAGNETIC TRANSMISSION

CROSS-REFERENCE TO RELATED APPLICATIONS

This application claims the benefit under 35 U.S.C. § 119(e) of U.S. provisional application Ser. No. 62/968,485, filed Jan. 31, 2020, the disclosure of which is incorporated by reference in its entirety.

FIELD

Disclosed embodiments are related to magnetic transmissions.

BACKGROUND

Actuators are used to generate motion, and may be evaluated based on metrics such as output displacement, output force, and/or output power. Typically, an actuator that is rated to deliver a higher peak power is larger and/or heavier than an actuator rated to deliver a lower peak power. The acceptable size and/or weight of an actuator may be constrained by the application in which the actuator is used.

SUMMARY

In one embodiment, an apparatus includes a magnetic screw comprising an elongate body, a nut selectively magnetically coupled to the magnetic screw, and a potential energy storage system. The nut is configured to be displaced relative to the elongate body in a first direction in response to manipulation of a magnetic field between the magnetic screw and the nut when the nut is magnetically coupled to the magnetic screw. The potential energy storage system is configured to store potential energy when the nut is displaced in the first direction.

In another embodiment, a method includes manipulating a magnetic field between a nut and a magnetic screw to displace the nut relative to the magnetic screw in a first direction, and storing potential energy when the nut is displaced in the first direction.

In yet another embodiment, an apparatus includes a magnetic screw comprising an elongate body, a nut selectively magnetically coupled to the magnetic screw, and a resistive force component. The nut is configured to be displaced relative to the elongate body in a first direction in response to manipulation of a magnetic field between the magnetic screw and the nut when the nut is magnetically coupled to the magnetic screw. The resistive force component is configured to resist a force when the nut is displaced in the first direction.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

In view of the limitations of current actuators, such as their size and/or weight, the inventors have recognized the benefits associated with systems capable of energy storage and release. Specifically, the inventors have recognized the benefits of using a magnetic transmission to store the energy output from an actuator and to selectively release the stored energy in an impulsive "burst". Such an arrangement may enable a small, lightweight actuator with a small average power output to exert a high peak power output, which may be beneficial in applications where a high peak power and/or small, lightweight actuators are desirable.

Without wishing to be bound by theory, most of the power (approximately 70-80%) used for walking may be provided by the ankle in a single, large burst (approximately 100 ms). In conventional exoskeletons configured to assist walking, this burst of power may be achieved either by using an actuator that is rated for the high peak power, which often results in actuators that are excessively heavy, or by over-driving lighter actuators, which may lead to premature failure of the actuators or associated components. However, this burst of power typically accounts for only about 10% of the gait cycle; for the rest of the gait cycle, the power required by the ankle is often much lower. Consequently, the average power over the gait cycle is often about 10% of peak power.

In view of the above, the inventors have recognized and appreciated that using a catapulting actuator may enable the use of a lower powered motor (or other actuator) in an exoskeleton configured to assist walking, which may lead to a significant weight savings, even with a transmission included, while also providing large peak powers. Specifically, the inventors have recognized and appreciated the benefits of a catapulting actuator that includes a magnetic transmission that is configured to store energy in a spring (or other potential energy storage system) and subsequently release the stored energy in a short, impulsive burst. A magnetic transmission may be desirable due to it being lighter and more compact than alternative catapulting actuators. For example, a small motor and a magnetic transmission capable of storing energy for impulsive release may be configured to deliver a high peak power during release using a lower average input power from the motor. Such an arrangement may be lighter than a larger motor rated for the same peak power. Additionally, a magnetic transmission may inherently include a built-in clutch.

In some embodiments, a magnetic transmission may include a magnetic screw and a nut. Magnetic interactions between the magnetic screw and the nut may be manipulated to generate relative motion between the nut and the magnetic screw. In some embodiments, changing the magnetic field(s) associated with a magnetic transmission may urge a nut to translate along a magnetic screw. For example, relative rotation between the magnetic screw and the nut may cause the nut to translate along a length of the magnetic screw. In some embodiments, a magnetic transmission may include a potential energy storage system configured to store potential energy due to the relative motion of the nut and the magnetic screw. For example, an elastic structure that is configured to store mechanical energy elastically (such as one or more springs, air springs, or other elastic structure) may be coupled to the magnetic screw such that as the nut moves relative to the magnetic screw, the elastic structure may be compressed to store potential energy. Alternative potential energy storage systems may include, but are not limited to: a pneumatic structure capable of compressing gas to store potential energy due to the relative motion of a nut and magnetic screw (e.g., displacement of one or more pistons within corresponding cylinders, compressing gas within a container, etc.); batteries and/or capacitors coupled to a regenerative generator driven by the relative motion of a nut and magnetic screw; a mass that is displaced relative to a local gravitational field due to the relative motion of a nut and magnetic screw; magnets that are displaced towards one another due to the relative motion of a nut and magnetic screw; ignition of a chemical reaction to release energy due to activation of a trigger by the relative movement of the nut and magnetic screw (e.g., ignition of a propellant similar to what occurs in ignition of a piston in a vehicle engine or air bag propellant); and/or any other appropriate arrangement capable of being operated to store and/or release potential energy in response to the relative motion of a nut and magnetic screw during operation. In some embodiments, the potential energy storage system may be configured to release the stored energy in a single impulsive burst, providing the catapulting behavior described above. In one such embodiment, decoupling the magnetic screw and nut, as may occur when the magnetic transmission is de-energized, may allow the spring, or other potential energy storage system, to release the stored energy as an impulsive burst.

In some embodiments, a magnetic screw may include an elongate body and one or more magnetic components. In some embodiments, the body of the magnetic screw may be cylindrical, toroidal, curved, or have any other appropriate shape as elaborated on below. The body of a magnetic screw may be solid, such as a solid rod, or the body of a magnetic screw may be hollow, such as a pipe. The cross-section of a body of a magnetic screw may be consistent along a longitudinal direction of the body of the magnetic screw, or the cross-section may vary as a function of longitudinal position along the body of the magnetic screw. The body of a magnetic screw may be iron, steel, titanium, plastic, ceramic, or any other suitable material. The body of a magnetic screw may be any suitable shape, size, geometry, or material, as the disclosure is not limited in this regard.

In some embodiments, a magnetic screw may include one or more magnetic components. The magnetic components of the magnetic screw may comprise any suitable magnetic components, such as permanent magnets, ferromagnetic material, electromagnets, or the like, as the disclosure is not limited in this regard. The magnetic components may be disposed on a body of a magnetic screw in any suitable arrangement. In some embodiments, the one or more magnetic components may be arranged around a circumference of a body of a magnetic screw in a regular pattern. In some embodiments, one or more magnetic components may be arranged helically on a body of a magnetic screw. The magnetic components may be disposed on a surface of a magnetic screw body or within an interior of the magnetic screw body, as the disclosure is not limited in this regard.

A magnetic transmission may also include a nut. In some embodiments, the nut may be selectively magnetically coupled to the magnetic screw. That is, a magnetic coupling between the nut and the magnetic screw may be selectively activated to couple and decouple the nut and screw of the magnetic transmission. Depending on the embodiment, manipulation of a magnetic coupling between a nut and a magnetic screw may cause linear and/or rotational motion of the nut relative to the magnetic screw in response to manipulation of one or more magnetic fields. For example, in a first operating mode, the nut may be magnetically coupled to the magnetic screw such that the nut is configured to translate along a longitudinal axis of a magnetic screw body in a first direction in response to relative rotation between the magnetic screw and the nut. Alternatively, the nut may be configured to rotate in response to translation of the magnetic screw relative to the nut. In a second mode of operation the nut and magnetic screw may be magnetically decoupled (e.g., electromagnets of one or both are turned off) such that the nut and magnetic screw are free to translate and/or rotate relative to one another. Although magnetic transmissions with a single nut have been discussed, magnetic transmissions with more than one nut are contemplated, and the disclosure is not limited in this regard.

In some embodiments, a nut may also include one or more magnetic components. The magnetic components of the nut may comprise any suitable magnetic components, such as permanent magnets, ferromagnetic material, electromagnets, or the like, as the disclosure is not limited in this regard. The magnetic components may be disposed on a nut of a magnetic transmission in any suitable arrangement. For example, magnetic components associated with a nut of a magnetic transmission may be arranged to mate with magnetic components of a magnetic screw of the magnetic transmission. In some embodiments, the one or more magnetic components of the nut may be arranged around a circumference of a nut in a regular pattern. In some embodiments, the one or more magnetic components may be arranged helically on a nut. The magnetic components may be disposed on a surface of a nut or within the interior of the nut, as the disclosure is not limited in this regard. In some embodiments, magnetic components of a nut may be disposed on an interior surface of the nut, and may be configured to mate with magnetic components of a magnetic screw that are disposed on an exterior surface of the magnetic screw.

Depending on the embodiment, the magnetic components of a magnetic screw and/or nut may be manipulated to adjust one or more magnetic fields associated with the magnetic components. In some embodiments, the magnetic components may include a plurality of electromagnets that may be individually addressed to be turned "on" or "off" discretely. In some embodiments, a strength of one or more magnetic fields associated with magnetic components may be controlled in a continuous manner. The present disclosure is not limited in regard to the number, type, and/or arrangement of magnetic components of a magnetic screw. Operation of these magnetic components relative to a nut is described further below.

The magnetic interactions between a magnetic screw and a nut may be manipulated in any suitable manner to cause relative motion between the magnetic screw and the nut. In some embodiments, a nut may include one or more helically arranged magnetic components, while a magnetic screw may include an array of addressable magnetic components. The addressable magnetic components of the magnetic screw may be alternately activated or deactivated to cause a pulsing and/or cyclical magnetic interaction between the nut and the magnetic screw that urges the nut to translate and/or rotate relative to the magnetic screw. Alternatively, the magnetic components of one or both of a nut and magnetic screw may be activated to magnetically couple the nut and magnetic screw. Relative rotation of the magnetic screw and nut may then result in a relative translation of the magnetic screw and nut, or vice versa. Thus, it should be understood that the magnetic interactions between a magnetic screw and nut may be manipulated in any desired manner to provide a relative motion between the magnetic screw and nut.

In some embodiments, a magnetic transmission may include a support structure to mechanically couple a nut to a magnetic screw. A support structure may include any suitable number of housings, rails, bearings, fasteners, or any other suitable components to couple a nut to a magnetic screw. In one embodiment, a support structure may include a housing for the nut. The nut housing may include one or more holes, gaps, cavities, or other suitable structures configured to accommodate one or more rails which may extend through the nut housing. The one or more rails may be coupled to the magnetic screw through one or more magnetic screw housings. In some embodiments, a magnetic screw may include a magnetic screw housing disposed at or near each end of a magnetic screw body. Rails may be coupled to the nut housing and the magnetic screw housings through any suitable number of bushings, linear bearings, rotary bearings, or other appropriate components. In some embodiments, the nut may be coupled to the nut housing through one or more rotary bearings to enable relative rotational motion between the nut and the nut housing. In some embodiments, the magnetic screw may be coupled to the magnetic screw housings through rotary bearings to enable relative rotational motion between the magnetic screw and the magnetic screw housings. However, it should be understood that the current disclosure is not limited to any particular housing or coupling present between the magnetic screw and the nut of a magnetic transmission.

As noted above, in some embodiments, a magnetic transmission may include a potential energy storage system. The potential energy system may be configured to store energy when a nut of the magnetic transmission is displaced relative to a magnetic screw body in any appropriate manner including, but not limited to relative rotation and/or translation between the magnetic screw and nut. In some embodiments, a potential energy storage system may be configured to store elastic potential energy, such as with one or more springs. For example, one or more springs may be disposed at or near ends of one or more rails of a support structure of a magnetic transmission. As a nut travels along the one or more rails in response to a magnetic interaction between the nut and a magnetic screw, the nut may compress the one or more springs disposed on the rails of the support structure. Of course, other embodiments in which springs are not disposed on the rails of a support structure are possible. For example, springs may be disposed on a nut housing or a magnetic screw housing. In some embodiments, a potential energy storage system may be configured to store magnetic potential energy. For example, magnetic components may be associated with a nut housing and a magnetic screw housing, such that as a nut translates or rotates relative to a magnetic screw one or more magnetic components associated with the nut may be translated towards one or more magnetic components associated with the magnetic screw to store potential energy which may be released when the magnetic screw and nut are magnetically decoupled. Of course, while magnets and axial springs are noted above, it should be understood that any appropriate construction capable of storing potential energy may be used including but not limited to, rotational springs, air springs, and/or any other construction capable of storing potential energy due to relative motion between a magnetic screw and nut.

In some embodiments, a potential energy storage system may also be configured to release the stored potential energy. For example, the stored potential energy may be released when the magnetic coupling between a magnetic screw and nut is released. In some embodiments, once the stored potential energy is released, a potential energy storage system may use the stored energy to apply a force to the nut and/or magnetic screw in a direction opposite the relative motion of the nut and magnetic screw used to store the potential energy. For instance, motion of a nut relative to a screw may compress one or more springs in a first direction, storing potential energy. The potential energy may then be released from the potential energy storage system by deactivating the magnetic field causing the spring to expand and displace the nut in a second direction opposite the first direction.

In some embodiments, a magnetic transmission may include a resistive force component. In some embodiments, a resistive force component may include a dissipative load component, such as a dashpot. Thus, a magnetic transmission may include a dissipative load component and/or a potential energy storage system. Thus, a magnetic transmission may include one or both of a dissipative load component and a potential energy storage system. In instances where both are included, the dissipative load component and the potential energy storage system may be arranged in any suitable configuration. For example, the dissipative load component and the potential energy storage system may be arranged in series or in parallel, as the disclosure is not limited in this regard.

In some embodiments, a magnetic transmission may include an air gap between a nut and a magnetic screw, and the nut may not physically touch the magnetic screw. Such an arrangement may be beneficial, as reducing or eliminating mechanical contact between the nut and the magnetic screw may make a magnetic transmission more energy efficient by reducing or eliminating friction and/or conductive heat transfer. Furthermore, such a magnetic transmission may be more robust or resilient, as physical wear between the nut and the magnetic screw may be reduced or eliminated. However, embodiments in which the nut is at least partially in contact with the magnetic screw, either directly or indirectly, such that the nut and magnetic screw rub against one another during motion are also contemplated as the disclosure is not so limited.

In some embodiments, a magnetic transmission may be backdrivable. In some embodiments, energy may be input into a magnetic transmission to cause relative motion between a nut and a magnetic screw. For example, electrical energy may be provided to a motor that causes relative rotation between a nut and a magnetic screw that in turn causes linear displacement between the nut and the magnetic screw. In some embodiments, mechanical energy input into the system may be used to generate electrical energy. For example, applying a force to a nut of a magnetic transmission may cause a magnetic screw of the magnetic transmission to rotate, which may be used to generate electrical energy.

The above discussion has generally referred to a magnetic transmission in a substantially linear arrangement. In these embodiments, a magnetic transmission may be thought of as a type of linear actuator, in which an input (such as electrical energy used to turn a motor used to cause relative rotation between a nut and a magnetic screw) may be used to generate linear motion (such as linear motion of a nut relative to a magnetic screw). However, other geometries are possible. In some embodiments, a body of a magnetic screw may be arranged in a substantially circular or curved shape. For example, a body of a magnetic screw may be configured as a torus, partial torus, or other appropriate curved structure in addition to the linear structures noted above. Relative rotational motion between one or more nuts and a toroidal or curved magnetic screw body may produce translation of the one or more nuts along a longitudinal axis of the body (such as a circumferential axis of the torus). As such, the one or more nuts may translate along a curved path. Such a magnetic transmission may be configured as a rotary actuator.

The disclosed magnetic transmissions may be used for any appropriate application. For example, while the current disclosure primarily discusses applying the disclosed magnetic transmissions as catapulting actuators for use in exoskeleton applications, other potential applications of magnetic transmissions are possible. For example, magnetic transmissions may be used in construction equipment, robotic actuators, transportation systems, medical devices, space systems, or any other suitable applications where it is desirable to apply a force. In particular, applications in which high peak power and lightweight actuation components are desirable may be particularly relevant, although the present disclosure is not limited to such applications. Thus, it should be understood that the disclosed systems are not limited to any particular application.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1A:
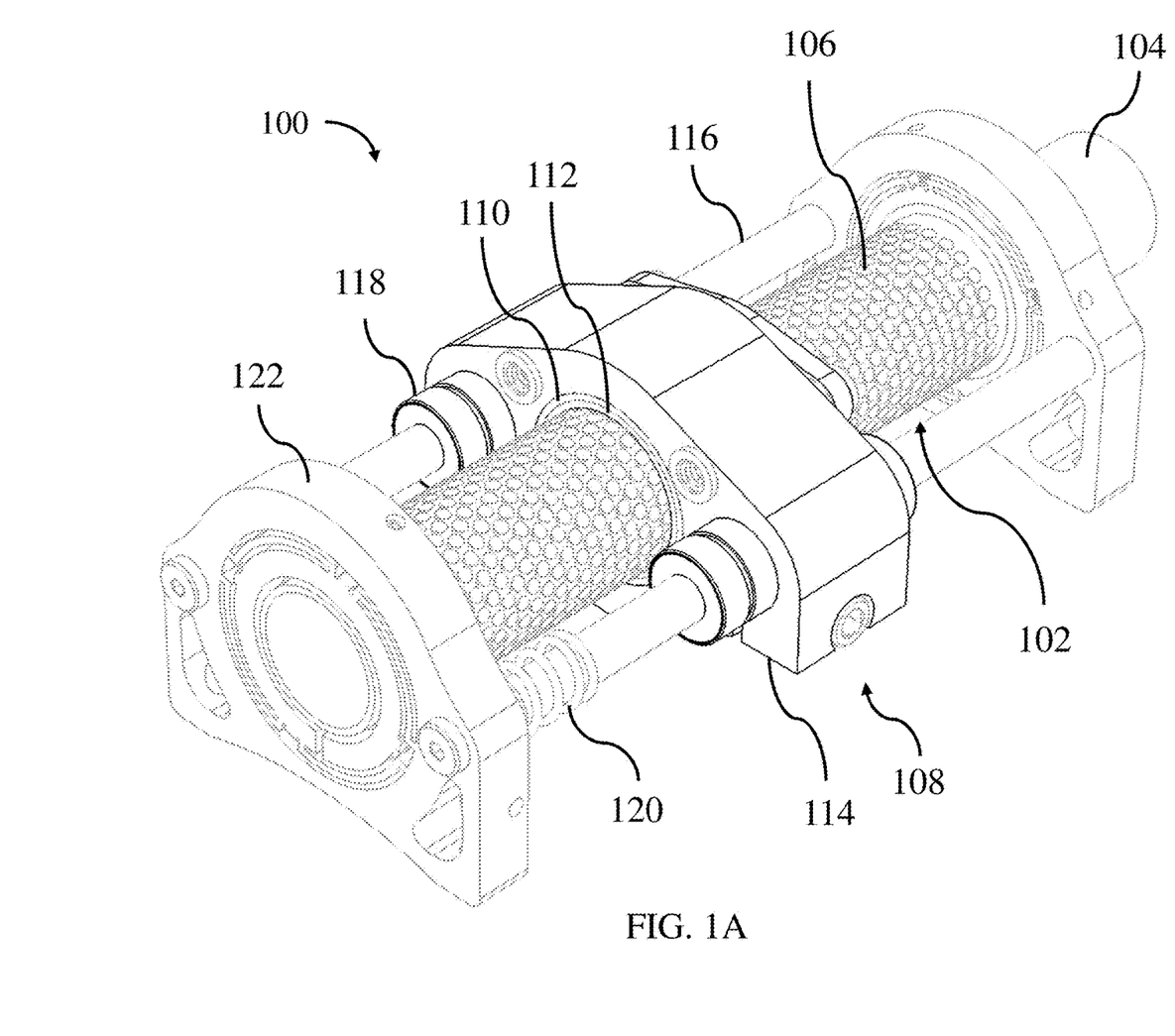
FIG. 1A is a perspective view of one embodiment of a magnetic transmission.
Figure 1B:
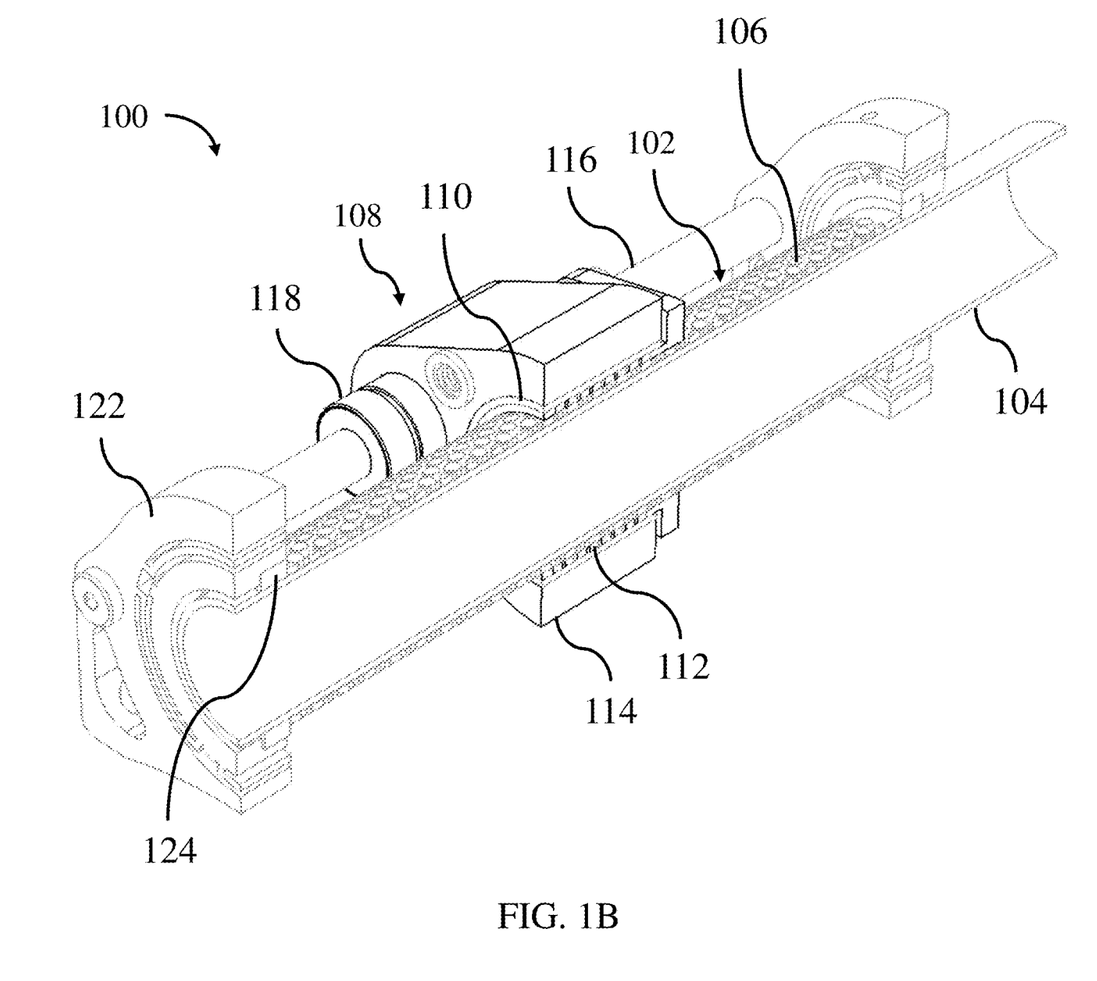
FIG. 1B is a cross-sectional perspective view of the magnetic transmission of FIG. 1A.

FIG. 1A is a perspective view of one embodiment of a magnetic transmission 100, and FIG. 1B is a cross-sectional perspective view of the magnetic transmission 100 of FIG. 1A. Magnetic transmission 100 includes a magnetic screw 102 and a nut 108. Magnetic screw 102 includes an elongate body 104 and one or more magnets 106. In the embodiment of the figures, the body 104 is a hollow, cylindrical shape, such as an iron pipe. In other embodiments, a magnetic screw body may be of a different shape, geometry, or material, as the disclosure is not limited in this regard. The magnets 106 of the magnetic screw may comprise any suitable magnetic components, such as permanent magnets, ferromagnetic material, electromagnets, or the like. The nut 108 includes a body 110 and one or more magnets 112. The magnets 112 of the nut may also comprise any suitable magnetic components, such as permanent magnets, ferromagnetic material, electromagnets, or the like. The nut is constructed such that it at least partially surrounds, and in the depicted embodiment, completely surrounds at least a portion of the magnetic screw such that the magnets of the nut are located proximate to at least a portion of the magnets of the magnetic screw. In some instances, the nut 108 is enclosed within a housing 114. The nut housing 114 may be coupled to two rails 116 through linear bearings 118. In other embodiments, a magnetic transmission may include more or fewer rails and/or be coupled to the magnetic screw in another appropriate manner, as the disclosure is not limited in this regard. The ends of the rails 116 are coupled to a housing 122 of the magnetic screw. The body 104 of the magnetic screw 102 is coupled to the housing 122 through a rotary bearing 124. Axial springs 120 are disposed on the rails 116 such that translation of the nut towards the springs compresses the springs between the nut and the magnetic screw housing 122 or other appropriate portion of the system. It should be understood that any suitable number of springs may be disposed at any appropriate location along the rails, as the disclosure is not limited in this regard.

Magnetic interactions between the magnets 106 of the magnetic screw 102 and the magnets 112 of the nut 108 urge the nut 108 to translate and/or rotate relative to the magnetic screw body 104. For example, in the depicted embodiment, rotation of the magnets of the screw relative to the magnets of the nut cause the nut to translate along a length of the magnetic screw towards the nut housing 114. After sufficient translation, a portion of the nut housing 114 contacts the springs 120 and begins to compress the springs 120. However, embodiments in which the springs are in contact with the nut throughout operation are also contemplated. In either case, translation of the nut in a first direction towards the springs may compress the springs to store potential energy therein. When the magnetic coupling between the magnets 106 of the magnetic screw 102 and the magnets 112 of the nut 108 is reduced or deactivated (e.g., when one or more electromagnetics are turned off), the stored potential energy may be released from the springs 120 in an impulsive burst accelerating the nut in a second direction opposite the first direction. In such an embodiment, the nut may be operatively coupled to an output of the magnetic transmission to apply the resulting impulse to a desired load.

Figure 2:
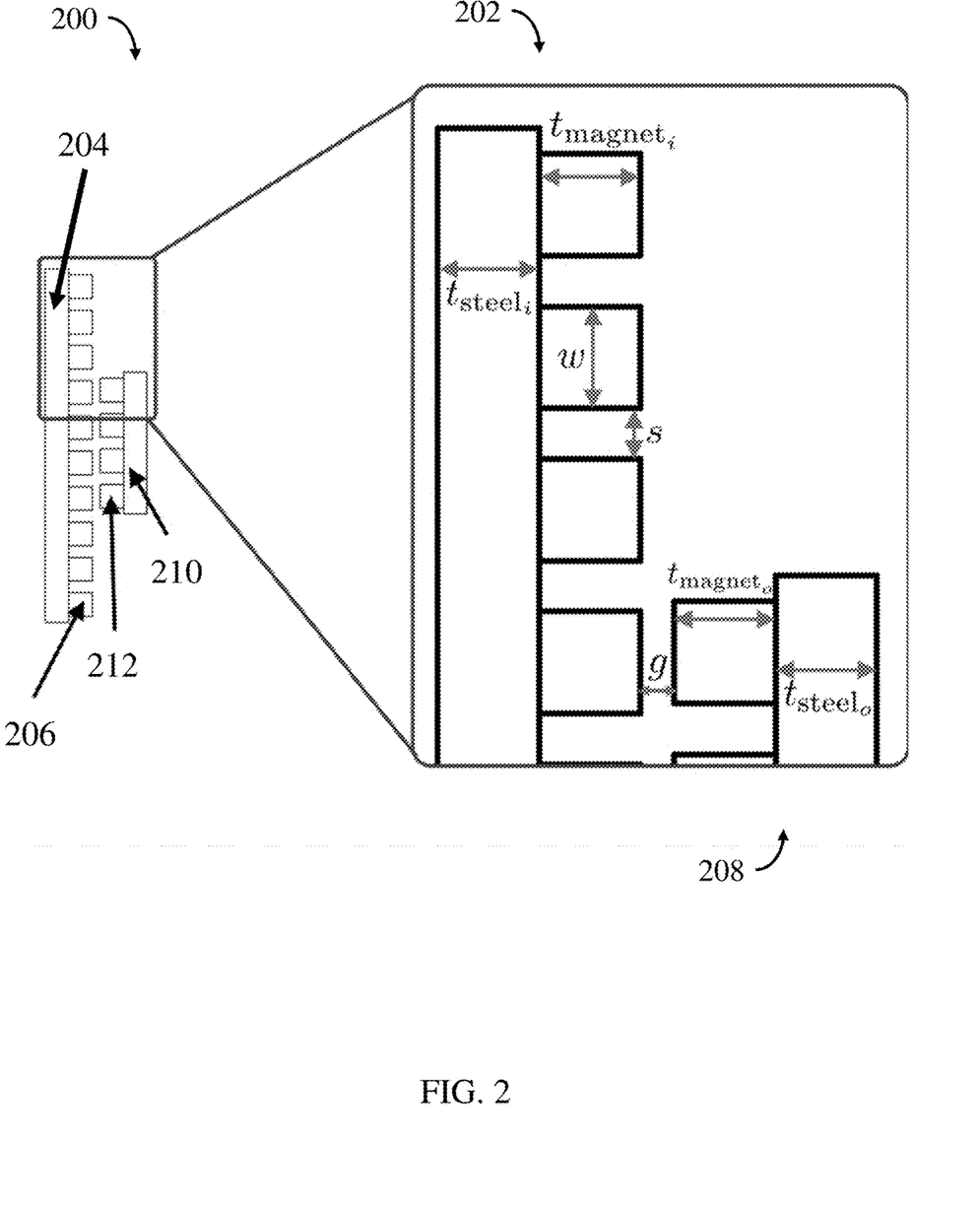
FIG. 2 is a cross-sectional front view of one embodiment of a magnetic transmission.

FIG. 2 is a cross-sectional front view of one embodiment of a magnetic transmission 200. Magnetic transmission 200 includes a magnetic screw 202 and a nut 208. Magnetic screw 202 includes a body 204 and one or more magnets 206. Nut 208 includes a body 210 and one or more magnets 212. In some embodiments, body 204 of the magnetic screw 202 may be a steel pipe with a wall thickness indicated by $t_{steel_i}$. The thickness of magnets 206 of magnetic screw 202 may be indicated by $t_{magnet_i}$, and the width of magnets 206 of magnetic screw 202 may be indicated by w. The spacing between magnets 206 may be indicated by s. In some embodiments, body 210 of nut 208 may be a steel pipe with a wall thickness indicated by $t_{steel_o}$. The thickness of magnets 212 of nut 208 may be indicated by $t_{magnet_o}$. An air gap between magnets 206 and magnets 212 may be indicated by g. These parameters may be any suitable value to enable operation of a magnetic transmission as described in this disclosure.

Figure 3A:
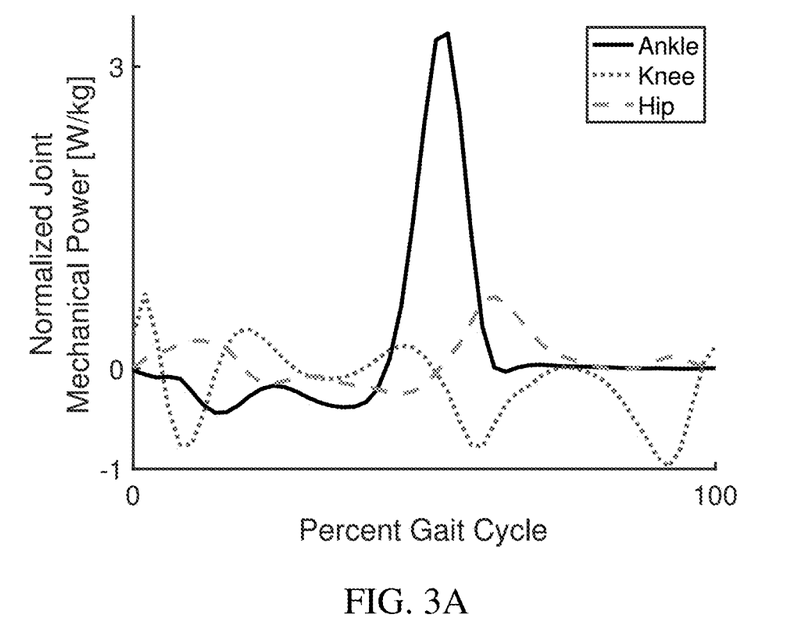
FIG. 3A depicts a power distribution of different joints of a leg while walking.
Figure 3B:
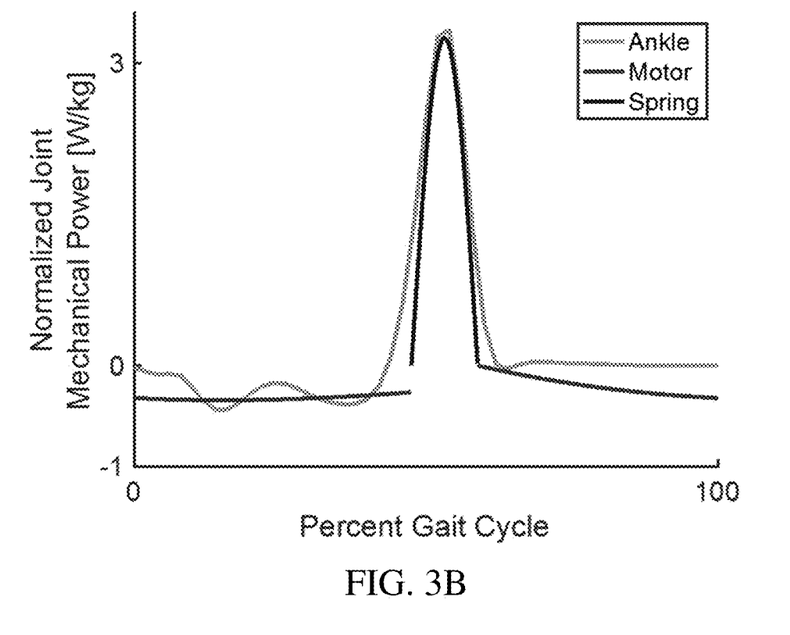
FIG. 3B depicts a power distribution of one embodiment of a magnetic transmission.

FIG. 3A depicts a power distribution of different joints of a leg while walking. As can be seen, the ankle delivers the greatest power, but only provides this peak power during a short duration. FIG. 3B depicts a power distribution of one embodiment of a magnetic transmission. The curve depicting the power output of an ankle during a gait cycle from FIG. 3A is overlaid on the graph of FIG. 3B for comparison. As can be seen, the combined power output of a motor and a spring of a magnetic transmission closely reproduces the behavior of an ankle, indicating that the disclosed systems may be appropriate for use in such an application.

Figure 4:
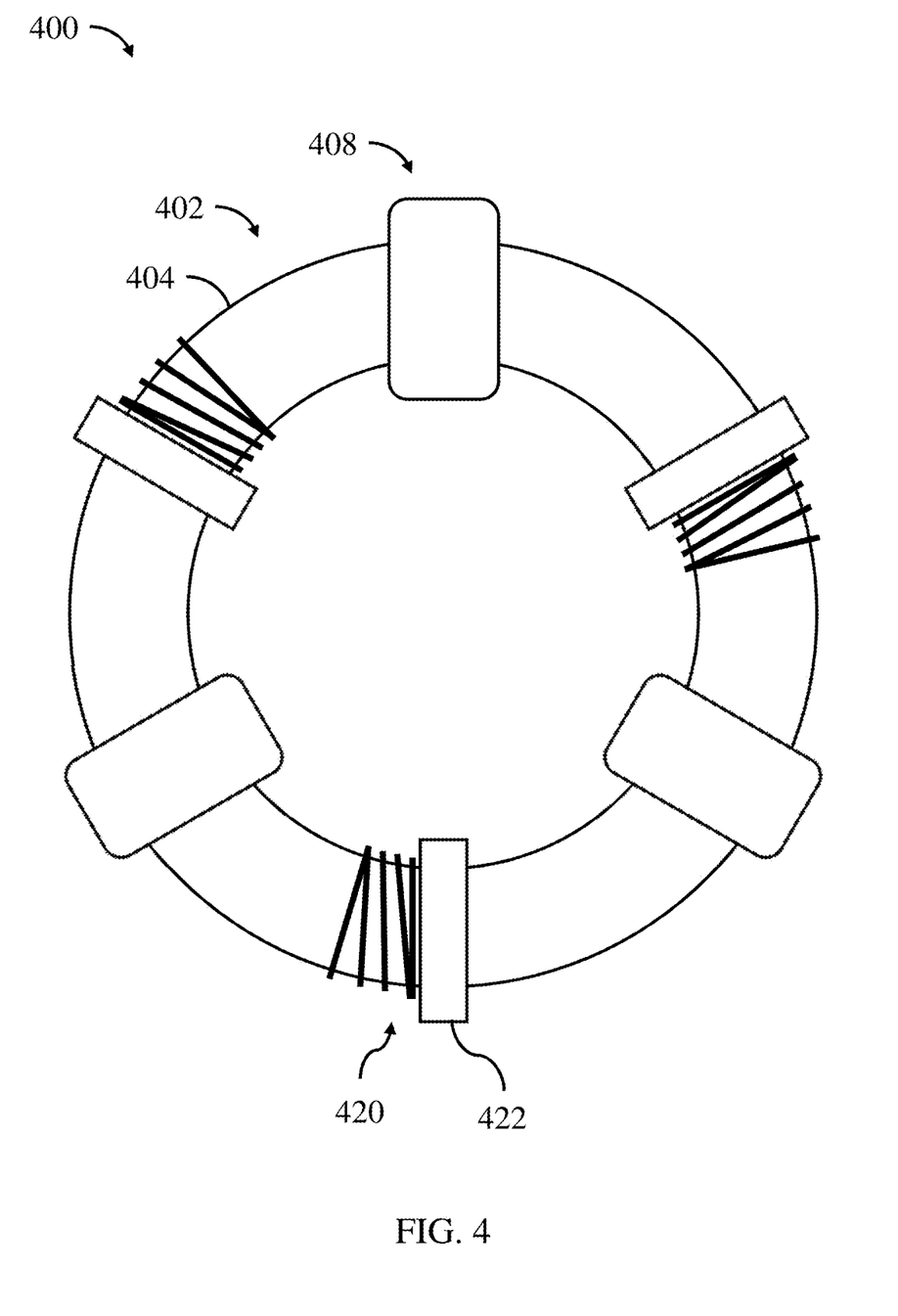
FIG. 4 is a top view of one embodiment of a magnetic transmission configured as a rotational actuator.

FIG. 4 is a top view of one embodiment of a magnetic transmission configured as a rotational actuator. A magnetic transmission 400 includes a magnetic screw 402 with a body 404 and magnets (not shown). The body 404 is depicted in the form of a torus. One or more nuts 408 that are selectively magnetically coupled to the magnetic screw are disposed along the circumference of the body 404 of the magnetic screw. One or more housings 422 or other structural features used to position and hold the body may also be disposed at one or more locations around the circumference of the body 404. Similar to the above embodiment, one or more springs 420, or other appropriate potential energy storage system, may be disposed adjacent the one or more housings 422. A support structure (not shown) may connect the nuts 408 so that the motion of the nuts 408 may be coupled.

Example: Optimizing Specific Force

In some embodiments, it may be desirable for a catapulting actuator to provide high power at low weight. Often, much of the weight (>60%) in the actuator may come from the magnets and steel body. Optimizing the magnetic screw for specific force (i.e., force per unit mass) may be challenging as there may be several variables to optimize over; without design rules and/or models, it may be unclear how the variables interact.

A prototype was built to determine if a magnetic transmission may meet the needs for an exoskeleton. The prototype transmission weighed 737 g. To reduce the overall weight of the prototype, the magnets and back-iron volume were reduced. One challenge was that there were many variables that were included in the optimization. The bounds of the dimensions for optimization in this example were as follows: the magnet widths, thicknesses, and spacing were bound between 1-7 mm, the steel thicknesses were also bound to be between 1-7 mm, the inner diameter was bound between 15-30 mm, and the air gap was bound between 0.1-2 mm.

Each optimization run consisted of several steps, and each step consisted of several iterations. Initially, a 3D finite element analysis (FEA) of a continuous helical magnetic screw was selected, but to use such a model in an optimization script over 9 variables was calculated to take approximately 1.75 years. By making an approximation to use 2D axisymmetric FEA, the optimization time was reduced to 1 month. By using a 2D axisymmetric analytical model, the optimization time was reduced to 3 hours. A sensitivity analysis was performed to see which variables dominated the design. Of the 9 variables that were optimized over, only two were identified as dominating (the rest were monotonic within the bounds of the variables). These two variables were the inner and outer magnet widths. Thus, this example demonstrates that an optimization over 9 variables with FEA that would take nearly 2 years could be reduced to an optimization over 2 variables with an analytical model that would take approximately 30 min. The results of the FEA showed that the 2D axisymmetric model was adequate in this example as it agrees with the 3D helical model to within 6%. The analytical model agrees with 2D FEA to within 3% in this example.

Example: Actuator Tuning

After the magnets and steel of the magnetic screw were optimized for specific force, the actuator was further modified to meet certain functional needs. In particular, the desired stiffness, mass, and stroke of the actuator may be derived from the peak power, the time of catapulting, and the desired force. In some embodiments, such calculations may result in a peak input power from the motor of 26 W with a peak output power from the spring of 217 W. The total mass of the magnetic screw transmission and the motor in this embodiment is 0.31 kg. This calculated weight is half the weight of the state-of-the-art actuator in powered exoskeletons.

The mass, stiffness and stroke equations that were used are given below in equations (1)-(3).

$$k = \frac{\pi F_c^2}{4 P_{peak} \Delta t} \quad (1)$$

$$m = \frac{F_c^2 \Delta t}{\pi P_{peak}} \quad (2)$$

$$X_0 = \frac{4 P_{peak} \Delta t}{\pi F_c} \quad (3)$$

These relations were used to design an actuator that approximates the behavior of a human ankle.

Additional calculations regarding an acceleration profile that minimizes input power show that the mass needed to deliver the desired power may be prohibitively high (14.4 kg). This apparent difficulty may be overcome by adjusting the position of the mass relative to the ankle (r), thereby altering the effective mass in the system, as explained below.

The effective mass of the model may be tuned with a lightweight nut by using the model given below in equation (4).

$$M = m + \frac{I}{r^2} \quad (4)$$

The model shows that the mass of the nut (m) may be kept low, but that a high effective mass (M) may be achieved by adjusting the distance of the attachment point relative to the ankle (r). In some embodiments, the mass of the nut m may be approximately 0.1 kg, the effective mass may be approximately M is 14.4 kg, and the distance r may be approximately 50 mm.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An apparatus comprising:
a magnetic screw comprising an elongate body;
a nut selectively magnetically coupled to the magnetic screw, the nut configured to be displaced relative to the elongate body in a first direction in response to manipulation of a magnetic field between the magnetic screw and the nut when the nut is magnetically coupled to the magnetic screw; and
a potential energy storage system configured to store potential energy when the nut is displaced in the first direction and to release the stored potential energy by magnetically decoupling the nut and magnetic screw.

2. The apparatus of claim 1, wherein an air gap is disposed between the nut and the magnetic screw.

3. The apparatus of claim 1, wherein the potential energy storage system comprises a spring.

4. The apparatus of claim 1, wherein the potential energy storage system comprises a magnet configured to store magnetic potential energy.

5. The apparatus of claim 1, wherein the potential energy storage system is further configured to release the stored potential energy in an impulsive burst.

6. The apparatus of claim 1, wherein the apparatus is backdrivable.

7. A method comprising:
   manipulating a magnetic field between a nut and a magnetic screw to displace the nut relative to the magnetic screw in a first direction;
   storing potential energy when the nut is displaced in the first direction; and
   releasing the stored potential energy by magnetically decoupling the nut and magnetic screw.

8. The method of claim 7, wherein releasing the stored potential energy comprises releasing the stored potential energy in an impulsive burst.

9. The method of claim 8, wherein releasing the stored potential energy comprises releasing the stored potential energy in an impulsive burst comprises accelerating the nut in a second direction opposite the first direction.

10. The method of claim 7, wherein storing potential energy includes storing elastic potential energy.

11. The method of claim 7, wherein storing potential energy includes storing magnetic potential energy.

12. The method of claim 7, wherein displacing the nut includes one or more selected from the group of translating the nut along a longitudinal axis of the magnetic screw and rotating the nut about the longitudinal axis of the magnetic screw.

13. An apparatus comprising:
   a magnetic screw comprising an elongate body;
   a nut selectively magnetically coupled to the magnetic screw, the nut configured to be displaced relative to the elongate body in a first direction in response to manipulation of a magnetic field between the magnetic screw and the nut when the nut is magnetically coupled to the magnetic screw, and wherein the magnetic screw and nut are configured to be magnetically decoupled; and
   a resistive force component configured to contact at least a portion of the nut and configured to resist a force when the nut is displaced in the first direction.

14. The apparatus of claim 13, wherein the resistive force component comprises a dissipative load component.

15. The apparatus of claim 14, wherein the dissipative load component comprises a dashpot.

16. The apparatus of claim 14, wherein the resistive force component is configured to resist motion of the nut in the first direction.

17. The apparatus of claim 16, wherein the resistive force component is configured to resist motion of the nut in the first direction by applying a resistive force to the nut at least partially in an opposing second direction.

18. The apparatus of claim 17, wherein the resistive force component comprises a dissipative load component.

19. The apparatus of claim 18, wherein the dissipative load component comprises a dashpot.

20. The apparatus of claim 14, further comprising a potential energy storage system configured to store potential energy when the nut is displaced in the first direction.

* * * * *